United States Patent
Gerlach

(10) Patent No.: US 10,652,932 B2
(45) Date of Patent: May 12, 2020

(54) DEVICE, METHOD, AND COMPUTER PROGRAM FOR ESTABLISHING A COMMUNICATION LINK BETWEEN AN INFORMATION SYSTEM AND A MOBILE DEVICE

(71) Applicant: VOLKSWAGEN AG, Wolfsburg (DE)

(72) Inventor: Simon Gerlach, Meine (DE)

(73) Assignee: Volkswagen AG (DE)

( * ) Notice: Subject to any disclaimer, the term of this patent is extended or adjusted under 35 U.S.C. 154(b) by 128 days.

(21) Appl. No.: 15/373,513

(22) Filed: Dec. 9, 2016

(65) Prior Publication Data
US 2017/0171893 A1    Jun. 15, 2017

(30) Foreign Application Priority Data

Dec. 10, 2015   (DE) .................. 10 2015 224 837

(51) Int. Cl.
*H04W 76/10*   (2018.01)
*H04W 4/48*    (2018.01)
(Continued)

(52) U.S. Cl.
CPC ............ *H04W 76/10* (2018.02); *H04L 63/20* (2013.01); *H04W 4/48* (2018.02); *H04W 12/00* (2013.01);
(Continued)

(58) Field of Classification Search
CPC ..... H04W 76/10; H04W 12/02; H04W 12/00; H04W 4/046; H04W 88/04; H04L 63/20; H04L 67/12
See application file for complete search history.

(56) References Cited

U.S. PATENT DOCUMENTS 7,653,037 B2    1/2010  Prakash et al.
2004/0097227 A1*  5/2004  Siegel .................. H04B 7/2606
                                                    455/431
(Continued)

FOREIGN PATENT DOCUMENTS

DE    102011008403 A1    9/2011
DE    102011080303 A1    2/2012
(Continued)

OTHER PUBLICATIONS

Search Report from German Patent Application No. 10 2015 224 837.2; dated Mar. 9, 2016.
(Continued)

*Primary Examiner* — Ivan O Latorre
(74) *Attorney, Agent, or Firm* — Barnes & Thornburg LLP

(57) ABSTRACT

Apparatuses, methods and computer programs for establishing a communication link between an information system and a mobile device. The apparatus for an information system includes a first communication module for communication with a computer infrastructure, a second communication module for communication with the mobile device, and a control module for controlling the first communication module and the second communication module. The control module obtains information about communication parameters for a communication link between the information system and the mobile device from the mobile device using the computer infrastructure and the first communication module and establishes the communication link between the information system and the mobile device using the second communication module based on the information about the communication parameters.

15 Claims, 3 Drawing Sheets

(51) Int. Cl.
  *H04W 12/00* (2009.01)
  *H04W 12/02* (2009.01)
  *H04L 29/06* (2006.01)
  *H04L 29/08* (2006.01)
  *H04W 88/04* (2009.01)

(52) U.S. Cl.
  CPC ............ *H04W 12/02* (2013.01); *H04L 67/12* (2013.01); *H04W 88/04* (2013.01)

(56) References Cited

U.S. PATENT DOCUMENTS

| | | | |
|---|---|---|---|
| 2006/0083187 A1 | 4/2006 | Dekel | |
| 2012/0163255 A1 | 6/2012 | Choi | |
| 2014/0310031 A1* | 10/2014 | Ricci | H04W 4/40 705/5 |
| 2015/0133108 A1* | 5/2015 | Ahmed | H04W 4/80 455/420 |
| 2015/0215954 A1* | 7/2015 | Pal | H04W 88/08 370/329 |
| 2015/0229604 A1* | 8/2015 | Pal | H04L 61/2007 370/254 |
| 2016/0143028 A1* | 5/2016 | Mancuso | H04L 63/20 370/338 |
| 2016/0241645 A1* | 8/2016 | Sabbaghian | H04L 67/12 |
| 2016/0309524 A1* | 10/2016 | Barreto De Miranda Sargento | H04W 76/10 |
| 2016/0366539 A1* | 12/2016 | Thanayankizil | H04W 36/36 |
| 2017/0092030 A1* | 3/2017 | Badger, II | B60R 25/102 |

FOREIGN PATENT DOCUMENTS

| | | |
|---|---|---|
| DE | 102011115962 A1 | 4/2012 |
| DE | 102012012381 A1 | 1/2013 |
| DE | 102012022701 A1 | 5/2014 |
| DE | 102012024869 A1 | 6/2014 |
| DE | 102014100084 A1 | 7/2014 |
| DE | 102015107505 A1 | 11/2015 |
| WO | 2008145451 A1 | 12/2008 |

OTHER PUBLICATIONS

Office Action for German Patent Application No. 10 2015 224 837.2; dated Aug. 16, 2018.

* cited by examiner

DEVICE, METHOD, AND COMPUTER PROGRAM FOR ESTABLISHING A COMMUNICATION LINK BETWEEN AN INFORMATION SYSTEM AND A MOBILE DEVICE

PRIORITY CLAIM

This patent application claims priority to German Patent Application No. 10 2015 224 837.2, filed 10 Dec. 2015, the disclosure of which is incorporated herein by reference in its entirety.

SUMMARY

Illustrative embodiments relate to apparatuses, methods and computer programs for establishing a communication link between an information system and a mobile device.

BRIEF DESCRIPTION OF THE DRAWINGS

Disclosed embodiments are described in more detail below with respect to the drawings, in which.

DETAILED DESCRIPTION

Figure 1:
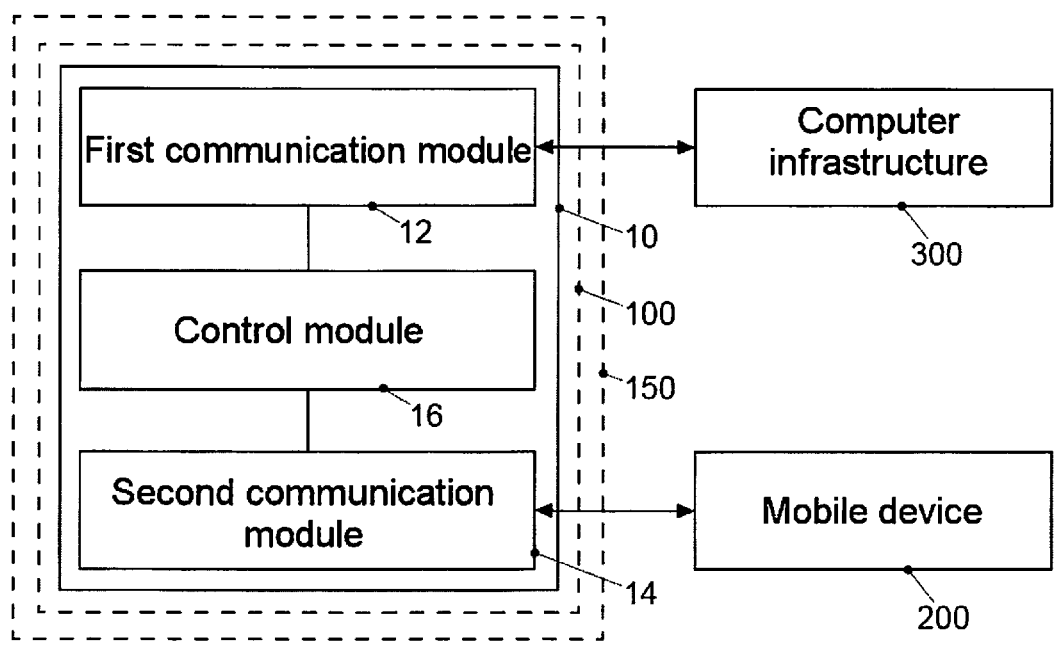
FIG. 1 illustrates a block diagram of an exemplary embodiment of an apparatus for an information system for the purpose of establishing a communication link between a mobile device and the information system.

A connection from mobile devices to information systems of vehicles is an important trend in vehicle construction. Functions of the mobile device, for example, the presentation of navigation information or the playback of music or other media, can be transmitted to a screen or a loudspeaker system of the vehicle. At the same time, the mobile device can provide the vehicle with a, possibly broadband, Internet connection.

In this case, establishing a connection between the mobile device and the information system is, for many potential users, an obstacle that can render use of the connection more difficult. Establishing a wired connection is a simple matter in most cases, since no additional actions by the user are necessary. Establishing a wireless connection, for example, using Bluetooth or a wireless local area access network (also called wireless local access network, WLAN) frequently requires active pairing of the devices, however, which in many cases comprises a series of operations.

There is a need to provide an improved design for establishing a connection between a mobile device and an information system, for example, an information system of a vehicle. This need is met by apparatuses and methods according to the independent claims.

Exemplary embodiments can achieve this by transmitting information about communication parameters using a first communication module that can be used to establish the connection using a second communication module. By way of example, a communication system for a vehicle may comprise a first communication module that can be used to transmit data between the vehicle manufacturer and the vehicle, for example, servicing data, etc. This data transmission may be limited to small volumes of data in some exemplary embodiments, for example, because the vehicle manufacturer accepts the costs for these transmissions. Therefore, the information about the communication parameters, which comprises only a small number of bits in some exemplary embodiments, for example, 48 bits of a Bluetooth media access address (also called medium access control address, MAC address), can be transmitted using the first communication module to set up a connection to the mobile device, for example, which can then, for its part, provide a mobile Internet connection for the vehicle, for example. By way of example, the information about the communication parameters can be used to take the parameters as a basis for initiating a pairing process, for example, as soon as an MAC address that the communication parameters comprise has been identified in the vehicle, which can simplify establishing the connection for a user of the vehicle.

Exemplary embodiments provide an apparatus for an information system, for example, for an information system of a vehicle, for establishing a communication link between a mobile device and the information system. The apparatus comprises a first communication module, designed for communication with a computer infrastructure. The apparatus further comprises a second communication module, designed for communication with the mobile device. The apparatus further comprises a control module, designed for controlling the first communication module and the second communication module. The control module is further designed for obtaining information about communication parameters for a communication between the information system and the mobile device from the mobile device using the computer infrastructure and the first communication module. The control module is further designed for establishing the communication link between the information system and the mobile device using the second communication module based on the information about the communication parameters. Obtaining the information about the communication parameters using the first communication module for the purpose of establishing the communication link using the second communication module can allow the connection to be established in a simplified manner, for example, can allow a pairing process to be initiated when the control module detects the presence of the mobile device using the second communication module.

In some exemplary embodiments, the information about the communication parameters can correspond to communication parameters buffer-stored on the computer infrastructure. By way of example, the buffer-stored communication parameters can be buffer-stored on the computer infrastructure by a further vehicle or by the mobile device, for example, a computer program (also called application, app for short) of the vehicle manufacturer on the mobile device. By way of example, this can allow a transmission of communication parameters for the purpose of establishing the connection between the information system and the mobile device in an accelerated or simplified manner.

In at least some exemplary embodiments, the control module can further be designed to obtain information about a connection request using the first communication module. The control module may further be designed to establish the communication further based on the information about the connection request. By way of example, the user of the mobile device can provide the information about the connection request using the mobile device using the computer infrastructure, for example, using an app of the vehicle manufacturer.

In at least some exemplary embodiments, the control module is further designed to store the information about the communication parameters. The control module may further be designed to set up the communication link based on the connection request and the stored communication parameters. By way of example, the control module may be designed to obtain and store the information about the communication parameters from the computer infrastructure periodically or in an event-based manner. By way of example, the control module may be designed to set up the connection based on the stored communication parameters if it detects the mobile device using the second communication module based on the stored communication parameters, or if a user of the vehicle initiates pairing using a function of the information system, for example, without the user selecting the mobile device during pairing using the information system.

In some exemplary embodiments, the control module may further be designed to retrieve the information about the communication parameters periodically from the computer infrastructure. This can allow the corresponding communication parameters to be available for connection setup when the mobile device is intended to be connected to the information system for the first time. By way of example, the control module may be designed to store the information about the communication parameters of a plurality of mobile devices to be able to establish the connection to a mobile device from the plurality of mobile devices when required.

In some exemplary embodiments, the first communication module is designed to use a vehicle-specific control channel to communicate with the computer infrastructure. The vehicle-specific control channel can allow the transmission of small volumes of data, for example, and can allow the communication link between the vehicle and the computer infrastructure, for example, without the need for an additional data link from the user to the computer infrastructure.

In at least some exemplary embodiments, the control module is designed to use the vehicle-specific control channel to communicate with the computer infrastructure and to use a broadband connection to communicate with the Internet using the second communication module and the mobile device. Communication with the Internet using the mobile device can decrease a data transmission using the vehicle-specific control channel and allow a broadband data transmission by the vehicle, for example.

Exemplary embodiments further provide an apparatus for a mobile device, for the purpose of establishing a communication link between the mobile device and an information system, for example, an information system of a vehicle. The apparatus comprises a first communication module, designed for communication with a computer infrastructure. The apparatus further comprises a second communication module, designed for communication with the information system. The apparatus further comprises a control module, designed for controlling the first communication module and the second communication module. The control module is further designed for providing information about communication parameters for a communication link between the information system and the mobile device for the information system using the computer infrastructure and the first communication module. The control module is further designed for establishing the communication link between the information system and the mobile device using the second communication module based on the information about the communication parameters. Provision of the information about the communication parameters using the first communication module for the purpose of establishing the connection using the second communication module can allow the connection to be established in a simplified manner, for example, can allow a pairing process to be initiated when the information system detects the presence of the mobile device.

In some exemplary embodiments, the control module may further be designed to determine the information about the communication parameters based on key information of the second communication module. The key parameters can be used by the information system, for example, to establish an encrypted connection to the mobile device.

In some exemplary embodiments, the control module may further be designed to determine the information about the communication parameters based on a hardware address of the second communication module. The hardware address, for example, a Bluetooth or WLAN MAC address, can be used to detect a presence of the mobile device in the vehicle and/or to initiate a pairing, for example.

In some exemplary embodiments, the control module may further be designed to provide the information system with information about a connection request using the first communication module. The control module may further be designed to set up the communication link further based on the information about the connection request. Provision of the connection request can allow the connection to be established in a simplified manner.

In at least some exemplary embodiments, the control module may further be designed to provide the information system with a broadband connection to the Internet. Communication by the information system with the Internet using the mobile device can decrease a data transmission using a vehicle-specific control channel of the vehicle and, by way of example, allow a broadband data transmission by the vehicle.

Exemplary embodiments further provide a method for an information system, for example, for an information system of a vehicle, for the purpose of establishing a communication link between a mobile device and the information system. The method comprises obtaining information about communication parameters for a communication link between the information system and the mobile device from the mobile device using a computer infrastructure. The method further comprises establishing the communication link between the information system and the mobile device based on the information about the communication parameters.

Exemplary embodiments further provide a method for a mobile device, for the purpose of establishing a communication link between the mobile device and an information system, for example, an information system of a vehicle. The method comprises providing information about communication parameters for a communication link between the information system and the mobile device for the information system using a computer infrastructure. The method further comprises establishing the communication link between the information system and the mobile device based on the information about the communication parameters.

Exemplary embodiments further provide a program having a program code for performing at least one of the methods when the program code is executed on a computer, a processor, a control module or a programmable hardware component.

Various exemplary embodiments are now described in more detail with reference to the accompanying drawings, which depict a few exemplary embodiments. In the figures, the thickness dimensions of lines, layers and/or regions may be depicted in an exaggerated manner for the sake of clarity.

In the description of the appended figures below, which show only some exemplary embodiments by way of example, like reference symbols can denote like or comparable components. Further, combinatory reference symbols can be used for components and objects that occur repeatedly in an exemplary embodiment or in a drawing, but are described jointly with regard to one or more features. Components or objects that are described using like or combinatory reference symbols can be embodied identically, but possibly also differently, in respect of single, multiple or all features, for example, their dimensions, unless the description explicitly or implicitly reveals otherwise.

Although exemplary embodiments can be modified and altered in various ways, exemplary embodiments are depicted as examples in the figures and are described comprehensively herein. However, it should be clarified that there is no intention to restrict exemplary embodiments to the forms respectively disclosed, rather that exemplary embodiments are intended to cover all functional and/or structural modifications, equivalents and alternatives that lie within the scope of the disclosed embodiments. Identical reference symbols denote identical or similar elements throughout the description of the figures.

It is noted that one element denoted as "connected" or "coupled" to another element can be directly connected or coupled to the other element or that intervening elements can be present. By contrast, if one element is denoted as "directly connected" or "directly coupled" to another element, then no intervening elements are present. Other terms used to describe the relationship between elements should be interpreted in a similar manner (e.g., "between" vis-à-vis "directly therebetween", "adjacent" vis-à-vis "directly adjacent", etc.).

The terminology used herein serves only to describe specific exemplary embodiments and is not intended to restrict the exemplary embodiments. As used herein, the single forms "a" and "the" are also intended to include the plural forms, unless clearly indicated otherwise by the context. Further, it should be clarified that the expressions, such as, e.g., "comprises", "comprising", "has" and/or "having", as used herein, indicate the presence of stated features, whole numbers, operations, work sequences, elements and/ or components, but do not rule out the presence or the addition of one or more features, whole numbers, operations, work sequences, elements, components and/or groups thereof.

Unless defined otherwise, all terms used herein (including technical and scientific terms) have the same meaning that is ascribed to them by a person of average skill in the art in the field to which the exemplary embodiments belong. Further, it should be clarified that expressions, e.g., those defined in generally used dictionaries, should be interpreted as if they had the meaning that is consistent with their meaning in the context of the relevant art, and should not be interpreted in an idealized or excessively formal sense, as long as this is not expressly defined herein.

There is an increasing spread of Internet-based functions for entertainment and information (infotainment) in cars. In this case, the Internet connection is, as a rule, established by the car using a telephone that the customer has brought with him. In conventional systems, two methods are customary:

Bluetooth tethering (tethering: provision of an Internet connection by a mobile device): vehicle establishes Bluetooth connection to the telephone and uses the Internet connection of the latter (e.g., using the protocol for remote to the SIM (subscriber identity module), remote SIM Access Profile, rSAP).

WLAN tethering: vehicle uses the WLAN access point of the telephone and uses the latter to establish the Internet connection.

For important core functions of the vehicle (e.g., tracking following theft, diagnosis, etc.), there is frequently also an emergency Internet connection, for example, using a vehicle-specific control channel, which works even without a customer telephone but is not used for infotainment functions, for example, because the data volume incurred in this case is at the cost of the vehicle manufacture.

In conventional systems, setting up the Internet connection of the car for infotainment functions can be expensive and complex. This may be an obstacle for users of the vehicle, meaning that they do not use all the functions of their vehicle, for example. Customers using rental cars, car sharing or leasing can use many different vehicles within short periods, for example, and can then establish the Internet connection afresh in each of the vehicles to be able to use all the infotainment functions.

Conventional pairing mechanisms, such as, e.g., simple secure pairing (SSP), pairing using near field communication (NFC) and secure WLAN setup (also called WiFi Protected Setup, WPS) have the drawback that the pairing takes place only between two devices at a short physical distance each time. Other pairing mechanisms, for example, for the purpose of transmitting WLAN keys, are not transferable to communication links that encrypt the connection based on an exchange of keys.

In the future, vehicles will be provided, for example, through introduction of eCall, with the technical prerequisites (data modem, SIM card) to establish an Internet connection. Since there is often no billing model for this data link in existence with the customer (the costs are frequently borne by the vehicle manufacturer), however, it is possible for a further Internet connection to be set up for other Internet-based functions of the vehicle—for example, using a customer mobile device (for example, a programmable mobile telephone, also called a smartphone) by means of tethering.

At least some exemplary embodiments can use a vehicle-specific control channel, for example, the connection for the eCall module together with an app on the customer smartphone and an online service, to simplify setup of the connection between the information system of the vehicle and the mobile device using the mobile device.

By way of example, exemplary embodiments can read information pertaining to tethering options for a smartphone (hotspot settings, Bluetooth address) by means of an app on this smartphone and can buffer-store this information in a computer infrastructure, for example, a server or a computer center of a vehicle manufacturer. The computer infrastructure may correspond to a computer infrastructure 300 of FIG. 1-4, for example.

An apparatus for an information system of a vehicle can obtain this information from the computer infrastructure using an Internet connection that is meant to be used by the device (vehicle) only in exceptional cases. The settings can be used in the device (vehicle) and the Internet connection via smartphone can be set up using the latter.

Optionally, the apparatus for the information system of the vehicle can provide a notification to the smartphone using the computer infrastructure, by means of which accompanying actions can be performed thereon to conclude establishing the Internet connection.

FIG. 1 illustrates a block diagram of an exemplary embodiment of an apparatus 10 for an information system 100, for the purpose of establishing a communication link between a mobile device 200 and the information system 100. FIG. 1 further shows a vehicle 150 comprising the information system 100.

By way of example, the information system 100 may correspond to an onboard information system of the vehicle 150 (also called an onboard unit, OBU), or to an infotainment system of the vehicle 150, for example, an embedded computer that provides functions for controlling vehicle functions and/or the vehicle entertainment system. By way of example, the mobile device may correspond to a mobile telephone, a programmable mobile telephone, a smartphone, a tablet computer or a mobile Internet access point (also called a hot spot). By way of example, the communication link may be based on a radio link, a radio-based data link, a wireless connection or a wireless data link. In some exemplary embodiments, the communication link may be based, by way of example, on an encryption, for example, based on an encryption phrase or based on an exchange of keys. The communication link may correspond by way of example to a Bluetooth communication link or a WLAN communication link.

The apparatus 10 comprises a first communication module 12, designed for communication with a computer infrastructure 300. The computer infrastructure 300 may correspond by way of example to a server, a group of servers, a computer center, a virtual server entity, a group of virtual server entities or a backend system of a vehicle manufacturer. The first communication module 12, and a first communication module 22 introduced below (FIG. 2), may be designed, by way of example, to communicate using a mobile radio network, for example, a cellular mobile radio network. The first communication module 12; 22 may be designed, by way of example, to communicate using at least one mobile radio system from the group comprising Global System for Mobile telecommunications (GSM), General Packet Radio Service (GPRS), Enhanced Data rates for GSM Evolution (EDGE), Universal Mobile Telecommunication System (UMTS), Long Term Evolution, and a 5th-generation mobile radio system (5G).

In at least some exemplary embodiments, the first communication module 12 may be designed to use a vehicle-specific control channel to communicate with the computer infrastructure 300. By way of example, the vehicle-specific control channel may correspond to a control channel at application level, for example, based on a cellular mobile radio system, and/or the vehicle-specific control channel may correspond to a channel of a vehicle-specific mobile radio system. In some exemplary embodiments, the vehicle-specific control channel can provide a lower, in comparison with a data channel of the mobile device, transmission bandwidth, for example.

The apparatus 10 further comprises a second communication module 14, designed for communication with the mobile device 200. The second communication module 14, and a second communication module 24 introduced below (FIG. 2), may be designed, by way of example, to communicate using a short-range radio network, for example, Bluetooth, WLAN, for example, based on IEEE (Institute of Electrical and Electronics Engineers) standard 802.11, or a microwave-based mobile radio network.

The apparatus 10 further comprises a control module 16, designed for controlling the first communication module 12 and the second communication module 14. In exemplary embodiments, the control module 16, and a control module 26 introduced below (FIG. 2), may correspond to an arbitrary controller or processor or to a programmable hardware component. By way of example, the control module 16; 26 may also be realized as software that is programmed for a corresponding hardware component. In this respect, the control module 16; 26 may be implemented as programmable hardware with appropriately adapted software. Arbitrary processors, such as digital signal processors (DSPs), can be used in this case. Exemplary embodiments are not restricted to one particular type of processor in this case. Arbitrary processors or multiple processors are conceivable for implementing the control module 16; 26.

The control module 16 is further designed for obtaining information about communication parameters for a communication between the information system 100 and the mobile device 200 from the mobile device 200 using the computer infrastructure 300 and the first communication module 12. The information about the communication parameters may be based, by way of example, on a hardware address of a communication module, for example, the second communication module 24, of the mobile device or may comprise the hardware address, for example, a Bluetooth MAC address or a WLAN MAC address. The information about the communication parameters may further comprise key information, for example, at least one element of the group of encryption parameters, parts of an encryption key, an encryption phrase, password, and login information. The information about the communication parameters may further comprise radio parameters, for example, frequencies used or a network descriptor. The information about the communication parameters may be in a digital bit format, for example, and, by way of example, may be encrypted, for example, based on an identification feature of a user of the vehicle 150 or of the mobile device 100.

In at least some exemplary embodiments, the information about the communication parameters may correspond to communication parameters buffer-stored on the computer infrastructure 300. The computer architecture 300 can obtain the communication parameters from the mobile device 200 or a further vehicle, for example, and/or can buffer-store the communication parameters for retrieval by the control module 16.

The control module 16 is further designed for establishing the communication link between the information system 100 and the mobile device 200 using the second communication module 14 based on the information about the communication parameters. By way of example, the control module 16 may be designed to establish the communication link based on a hardware address of the mobile device 200. By way of example, the control module 16 may be designed to use the second communication module 14 to detect the mobile device 200 and to take the detection as a basis for starting a pairing process, for example, a Bluetooth pairing process. By way of example, the control module 16 may be designed to distinguish whether it has previously already established a communication link to the mobile device 200, and to start a pairing process if it has not yet established a communication link to the mobile device 200 beforehand. To establish the communication link, the control module 16 may be designed to provide an exchange of keys between the information system 100 and the mobile device 200, for example. In at least some exemplary embodiments, the control module 16 may be designed to establish the communication link based on key information of the mobile device 200 that the information about the communication parameters may comprise. By way of example, the control module 16 may be designed to join an encrypted WLAN access point of the mobile device based on the key information for the purpose of establishing the communication link.

The control module 16 is coupled to the first communication module 12 and to the second communication module 14. Exemplary embodiments further provide the information system 100 for the vehicle 150 comprising the apparatus 10 and the vehicle 150 comprising the information system 100 and the apparatus 10.

In at least some exemplary embodiments, the control module 16 may further be designed to obtain information about a connection request using the first communication module 12. The control module 16 may further be designed to establish the communication link further based on the information about the connection request. By way of example, the information about the connection request can be provided by the mobile device 200, for example, using the computer infrastructure 300, or it can be provided by the information system 100 or the vehicle 150, for example, based on operation of a switch or a button. By way of example, the information about the connection request may correspond to a data packet that indicates that a user of the mobile device 200 or of the vehicle 150 wishes to establish the communication link between the information system 100 and the mobile device 200.

In some exemplary embodiments, the control module 16 may further be designed to store the information about the communication parameters. By way of example, the control module 16 may be designed to store, manage and/or stock the information about the communication parameters of a plurality of mobile devices. By way of example, the control module 16 may be designed to store information about communication parameters of multiple mobile devices of a user or information about communication parameters of multiple users. The control module 16 may further be designed to set up the communication link based on the connection request and the stored communication parameters.

In some exemplary embodiments, the control module 16 may further be designed to retrieve the information about the communication parameters periodically from the computer infrastructure. Alternatively or additionally, the control module 16 may be designed to obtain the information about the communication parameters from the computer infrastructure in an event-based manner, for example, when adding a new piece of information about communication parameters in the computer infrastructure, based on manually initiated retrieval of the information about the communication parameters or based on a vehicle state, for example, when starting, when transmitting configuration information or during servicing. In some exemplary embodiments, the control module 16 may be designed to retrieve the information about the communication parameters from the computer infrastructure once by user request.

In at least some exemplary embodiments, the control module 16 may be designed to use the vehicle-specific control channel to communicate with the computer infrastructure 300 and to use a broadband connection to communicate with the Internet using the second communication module 14 and the mobile device 200. By way of example, the mobile device 200 may be designed to provide the control module 16 with a tethering connection, for example, using Bluetooth or WLAN. By way of example, the control module 16 may be designed to use the Internet connection of the mobile device for transmitting content for the information system 100.

In at least some exemplary embodiments, the vehicle 150 may correspond to a land vehicle, a watercraft, an aircraft, a rail vehicle, a road vehicle, a car, an all-terrain vehicle, a motor vehicle or a truck, for example.

Figure 2:
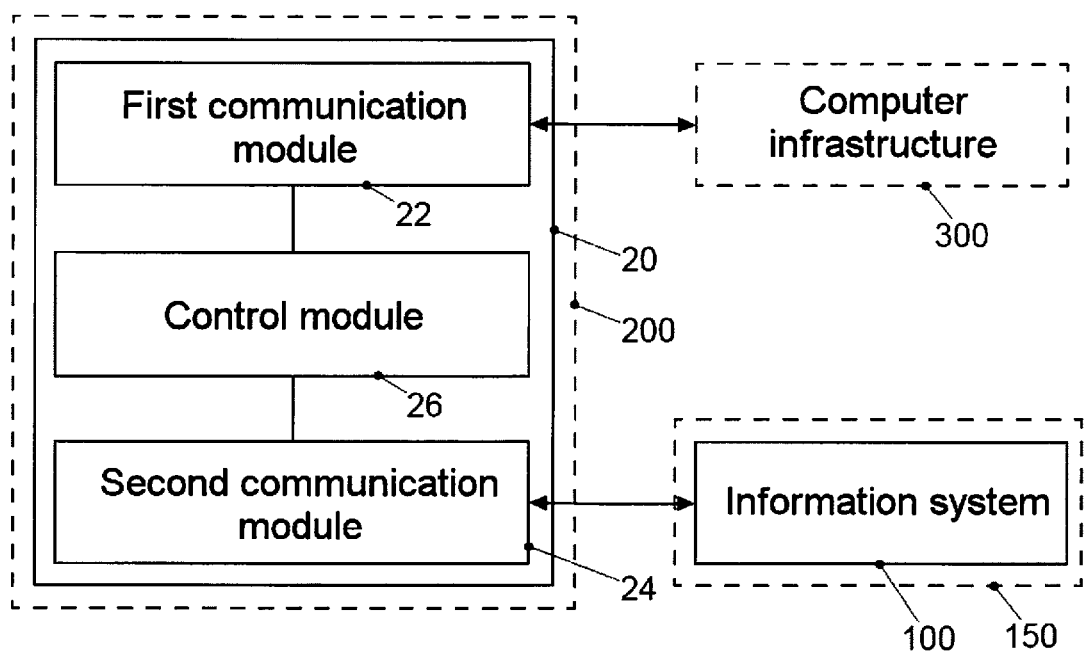
FIG. 2 illustrates a block diagram of an exemplary embodiment of an apparatus for a mobile device for the purpose of establishing a communication link between the mobile device and an information system.

FIG. 2 illustrates a block diagram of an exemplary embodiment of an apparatus 20 for a mobile device 200, for the purpose of establishing a communication link between the mobile device 200 and an information system 100, for example, an information system 100 of a vehicle 150. The apparatus 20 comprises a first communication module 22, designed for communication with a computer infrastructure 300. The apparatus further comprises a second communication module 24, designed for communication with the information system 100. The apparatus 20 further comprises a control module 26, designed for controlling the first communication module 22 and the second communication module 24. In some exemplary embodiments, the control module 26 may be implemented, by way of example, as a computer program or app for the mobile device 200, for example, a smartphone, or may correspond to a computer program or an app.

The control module 26 is further designed for providing information about communication parameters for a communication link between the information system 100 and the mobile device 200 for the information system using the computer infrastructure 300 and the first communication module 22. By way of example the control module 26 may be designed to determine the information about the communication parameters based on key information of the second communication module 24. By way of example, the key information may correspond to a WLAN key of a WLAN access point that the control module 26 may be designed to provide. The key information may further correspond to a key and/or a portion of a key for encrypting the communication link.

In at least some exemplary embodiments, the control module 26 may be designed to determine the information about the communication parameters based on a hardware address of the second communication module 24, for example, based on a Bluetooth MAC or a WLAN MAC of the second communication module.

The control module 26 is further designed for establishing the communication link between the information system 100 and the mobile device 200 using the second communication module 24 based on the information about the communication parameters. By way of example, the control module 26 may be designed to confirm a pairing process based on the information about the communication parameters, to accept a pairing request and/or to allow a user of the mobile device simplified pairing confirmation. By way of example, the control module 26 may be designed to determine the information about the communication parameters based on a pairing pin, and the control module 26 may be designed to confirm a pairing process based on the pairing pin. In some exemplary embodiments, the control module may be designed to provide a WLAN access point based on the information about the communication parameters, and the communication module 16 may be designed to establish the communication link to the WLAN access point.

The control module 26 is coupled to the first communication module 22 and to the second communication module 24. Exemplary embodiments further provide the mobile device 200 comprising the apparatus 20.

In some exemplary embodiments, the control module 26 may further be designed to provide the information system 100 with information about a connection request using the first communication module 22. The control module 26 may be designed to set up the communication link further based on the information about the connection request. By way of example, the control module 26 may be designed to determine information about the connection request based on a button of an app that is executed on the mobile device. By way of example, the control module 26 may be designed to take the information about the connection request as a basis for changing to a pairing mode and/or granting a pairing request.

In some exemplary embodiments, the control module 26 may further be designed to provide the information system 100 with a broadband connection to the Internet. By way of example, the control module 26 may be designed to provide the information system 100 with a tethering connection.

More details of the apparatus 20 (e.g., information system 100, mobile device 200, vehicle 150, first communication module 22, second communication module 24, control module 26, computer infrastructure 300, information about communication parameters, key information, information about a connection request) are cited in conjunction with the design or examples that have been described above (e.g., FIG. 1). The apparatus 20 may comprise one or more additional optional features that correspond to one or more embodiments of the proposed design or of the described examples, as have been described above or below.

In at least one exemplary embodiment by way of example, the control module 26 is designed to provide the information system 100 with a WLAN tethering connection to the Internet. The exemplary embodiment by way of example comprises the following method operations:

1. A user of the vehicle has installed a special app on the smartphone (for example, the mobile device 200) that he wishes to use to establish the Internet connection in the vehicles that he uses (for example, the vehicle 150);

2. The user is logged in on the app with a user account, and the app is connected to a backend system (for example, the computer infrastructure 300) on which it can buffer-store data;

3. The app may contain, by way of example, a button that the user can use to request that he would like to use the smartphone on which he executes the app to establish an Internet connection in future in vehicles that he uses;

4. When the button is operated, the control module 26 may be designed to use local interfaces on the smartphone to read what settings he uses when the smartphone is operated as a WLAN hot spot (network name, password, etc.). If need be, the control module 26 may be designed to perform the hot spot configuration (e.g., when the hot spot has not yet been set up) and can activate the hot spot. The control module 26 may be designed to transmit the hot spot settings comprised in the information about the communication parameters to the backend system;

5. The user can now log in in the vehicle with his user account, which he has also used in the app, for example, using the control module 16 and/or the information system 100. Using the vehicle-specific control channel, the control module 16 may be designed to read the hot spot settings of the smartphone of the customer from the user account in the backend system;

6. The control module 16 can adopt the communication parameters and attempt to use the communication link via the hot spot to establish the Internet connection; and 7. Optionally, the control module 16 can be used to use the backend system to send a notification to the smartphone (or by means of data SMS or the like) that is received by the app on the smartphone. The control module 26 may be designed, based on the notification, to check whether the hot spot has been activated, and if not, to perform this if need be. Such a notification can be initiated automatically, e.g., when the hot spot settings of the vehicle are retrieved.

In a further exemplary embodiment by way of example, the control module 26 is designed to provide the information system 100 with a Bluetooth tethering connection to the Internet. The exemplary embodiment by way of example comprises the following method operations:

1. The first three operations are analogous to the previous exemplary embodiment. A user of the vehicle has installed a special app on the smartphone (for example, the mobile device 200) that he wishes to use to establish the Internet connection in the vehicles that he uses (for example, the vehicle 150);

2. The user is logged in on the app with a user account, and the app is connected to a backend system (for example, the computer infrastructure 300) on which it can buffer-store data;

3. The app may contain, by way of example, a button that the user can use to request that he would like to use the smartphone on which he executes the app to establish an Internet connection in future in vehicles that he uses;

4. When the button is operated, the control module 26 may be designed to use local interfaces on the smartphone to read the Bluetooth address of the latter. If need be, the control module 26 may be designed to perform the Bluetooth configuration (if, e.g., the remote SIM card access profile, also called remote SIM Access Profile, SIM for Subscriber Identity Module, has not yet been activated) and/or to activate Bluetooth. The control module 26 may be designed to transmit the Bluetooth settings or address comprised in the information about the communication parameters to the backend system. A link ID can now be generated in the backend.

5. The user can now log on in the vehicle with his user account, which he has also used in the app, for example, using the control module 16 and/or the information system 100. Using the vehicle-specific control channel, the control module 16 may be designed to read the Bluetooth settings and/or address of the smartphone of the customer from the user account in the backend system;

6. The control module 16 can adopt the communication parameters and attempt to establish a Bluetooth link to the smartphone using the Bluetooth address of the latter.

7. Optionally, the control module 16 can be used to use the backend system to send a notification to the smartphone (or by means of data SMS or the like) that is received by the app on the smartphone. The control module 26 may be designed, based on the notification, to check whether Bluetooth has been activated and incoming connections are accepted, and/or can activate this. If the control module 26 detects a connection attempt within a predefined time window, then the connection attempt can be automatically acknowledged by the control module 26 (this can involve the link ID generated in the backend or a transmitted PIN being used that has either been transmitted as well as part of the notification or has already been loaded by the app from the backend at an earlier time).

Figure 3:
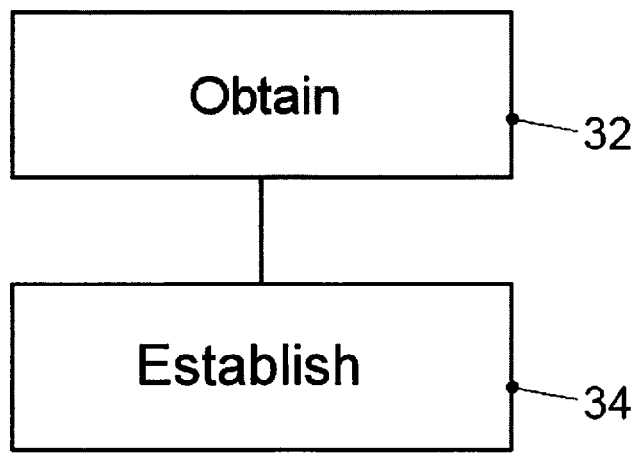
FIG. 3 illustrates a flowchart for an exemplary embodiment of a method for an information system for the purpose of establishing a communication link between a mobile device and the information system.

FIG. 3 illustrates a flowchart for an exemplary embodiment of a method for an information system 100, for example, for an information system 100, of a vehicle 150, for the purpose of establishing a communication link between a mobile device 200 and the information system 100. The method comprises obtaining 32 information about communication parameters for a communication link between the information system 100 and the mobile device 200 from the mobile device 200 using a computer infrastructure 300. The method further comprises establishing 34 the communication link between the information system 100 and the mobile device 200 based on the information about the communication parameters.

Figure 4:
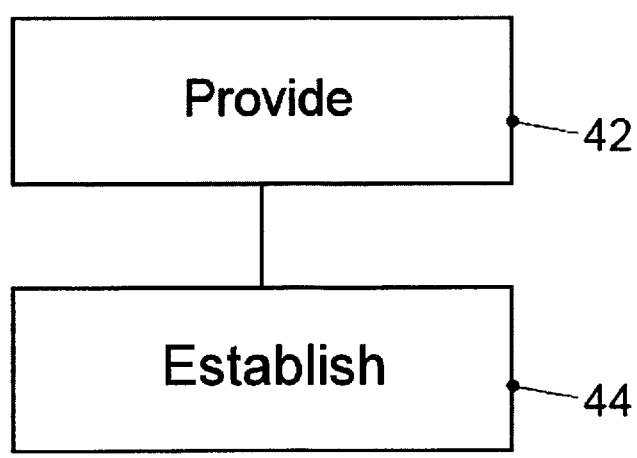
FIG. 4 illustrates a flowchart for an exemplary embodiment of a method for a mobile device for the purpose of establishing a communication link between the mobile device and an information system.

FIG. 4 illustrates a flowchart for an exemplary embodiment of a method for a mobile device 200, for the purpose of establishing a communication link between the mobile device 200 and an information system 100, for example, an information system 100 of a vehicle 150. The method comprises providing 42 information about communication parameters for a communication link between the information system 100 and the mobile device 200 for the information system 100 using a computer infrastructure 300. The method further comprises establishing 44 the communication link between the information system 100 and the mobile device 200 based on the information about the communication parameters.

A further exemplary embodiment is a computer program for performing at least one of the methods described above when the computer program runs on a computer, a processor or a programmable hardware component. A further exemplary embodiment is also a digital storage medium that is machine- or computer-readable and that has electronically readable control signals that can interact with a programmable hardware component such that one of the methods described above is carried out.

The features disclosed in the description above, the claims below and the enclosed figures may be of importance, and can be implemented, both individually and in any desired combination for the realization of an exemplary embodiment in its various configurations.

Although some embodiments have been described in connection with an apparatus, it goes without saying that these embodiments also represent a description of the corresponding method, so that a block or a component of an apparatus should also be considered as a corresponding method operation or as a feature of a method operation. Analogously to this, embodiments described in connection with or as a method operation also represent a description of a corresponding block or detail or feature of a corresponding apparatus.

Depending on particular implementation requirements, exemplary embodiments may be implemented in hardware or in software. The implementation can be performed using a digital storage medium, for example, a floppy disk, a DVD, a Blu-ray disc, a CD, a ROM, a PROM, a EPROM, a EEPROM or a FLASH memory, a hard disk or another magnetic or optical memory that stores electronically readable control signals that can interact or do interact with a programmable hardware component such that the respective method is performed.

A programmable hardware component may be formed by a processor, a computer processor (CPU=Central Processing Unit), a graphics processor (GPU=Graphics Processing Unit), a computer, a computer system, an Application-Specific Integrated Circuit (ASIC), an integrated circuit (IC), a system on chip (SOC), a programmable logic element or a field programmable gate array having a microprocessor (FPGA).

The digital storage medium may therefore be machine- or computer-readable. Some exemplary embodiments thus comprise a data storage medium that has electronically readable control signals that are capable of interacting with a programmable computer system or a programmable hardware component such that one of the methods described herein is performed. At least one exemplary embodiment is, therefore, a data storage medium (or a digital storage medium or a computer-readable medium) on which the program for performing one of the methods described herein is recorded.

Generally, exemplary embodiments may be implemented as a program, firmware, computer program or computer program product having a program code or as data, wherein the program code or the data is or are operative to the effect of performing one of the methods when the program runs on a processor or a programmable hardware component. The program code or the data may, by way of example, also be stored on a machine-readable storage medium or data storage medium. The program code or the data can be present inter alia as source code, machine code or byte code and as other intermediate code.

A further exemplary embodiment is further a data stream, a signal train or a sequence of signals that represents or represent the program for performing one of the methods described herein. The data stream, the signal train or the sequence of signals may be configured, by way of example, to the effect of being transferred via a data communication link, for example, via the Internet or another network. Exemplary embodiments are thus also data-representing signal trains that are suitable for sending via a network or a data communication link, wherein the data represent the program.

A program according to at least one exemplary embodiment can implement one of the methods while it is performed, for example, by reading memory locations or writing a datum or multiple data thereto, as a result of which, if need be, switching processes or other processes are brought about in transistor structures, in amplifier structures or in other electrical components, optical components, magnetic components or components operating on another functional principle. Accordingly, reading a memory location allows data, values, sensor values or other information to be captured, determined or measured by a program. Therefore, by reading one or more memory locations, a program can capture, determine or measure variables, values, measured variables and other information, and by writing to one or more memory locations, it can bring about, prompt or perform an action and actuate other devices, machines and components.

The exemplary embodiments described above are merely an illustration of the principles. It goes without saying that modifications and variations of the arrangements and details described herein will become apparent to other persons skilled in the art. Therefore, the intention is for the disclosed embodiments to be restricted only by the scope of protection of the patent claims below, and not by the specific details that have been presented herein on the basis of the description and the explanation of the exemplary embodiments.

LIST OF REFERENCE SYMBOLS

10 Apparatus for an information system of a vehicle
12 First communication module
14 Second communication module
16 Control module
20 Apparatus for a mobile device
22 First communication module
24 Second communication module
26 Control module 100 Information system of a vehicle
150 Vehicle
200 Mobile device
300 Computer infrastructure

The invention claimed is:

1. A vehicle information system apparatus for establishing a communication link between a mobile device and the vehicle information system, the apparatus comprising:
    a first communication module for communication with a computer infrastructure;
    a second communication module for communication with the mobile device; and
    a control module for:
        controlling the first communication module and the second communication module,
        obtaining information about communication parameters for a communication link between the vehicle information system and the mobile device from the mobile device using the computer infrastructure and the first communication module, and
        establishing the communication link between the vehicle information system and the mobile device using the second communication module based on the information about the communication parameters, wherein the information about the communication parameters includes hot spot settings of the mobile device, wherein the mobile device is operable as a hot spot to establish the communications link,
    wherein the first communication module uses a vehicle-specific control channel to communicate with the computer infrastructure.

2. The apparatus of claim 1, wherein the information about the communication parameters corresponds to communication parameters buffer-stored on the computer infrastructure.

3. The apparatus of claim 1, wherein the control module further obtains information about a connection request using the first communication module, and wherein the control module establishes the communication link further based on the information about the connection request.

4. The apparatus of claim 3, wherein the control module stores the information about the communication parameters, and wherein the control module sets up the communication link based on the connection request and the stored communication parameters.

5. The apparatus of claim 1, wherein the control module retrieves the information about the communication parameters periodically from the computer infrastructure.

6. The apparatus of claim 1, wherein the control module uses the vehicle-specific control channel to communicate with the computer infrastructure and uses a broadband connection to communicate with the Internet using the second communication module and the mobile device.

7. A mobile device apparatus for establishing a communication link between the mobile device and a vehicle information system, the apparatus comprising:
    a first communication module for communication with a computer infrastructure;
    a second communication module for communication with the vehicle information system; and
    a control module for:
        controlling the first communication module and the second communication module,
        providing information about communication parameters for a communication link between the vehicle information system and the mobile device for the vehicle information system using the computer infrastructure and the first communication module, wherein the information about the communication parameters includes hot spot settings of the mobile device, and
        establishing the communication link between the vehicle information system and the mobile device using the second communication module based on the information about the communication parameters, wherein the mobile device is operable as a hot spot to establish the communications link.

8. The apparatus of claim 7, wherein the control module further determines the information about the communication parameters based on key information of the second communication module.

9. The apparatus of claim 7, wherein the control module further determines the information about the communication parameters based on a hardware address of the second communication module.

10. The apparatus of claim 7, wherein the control module further provides the vehicle information system with information about a connection request using the first communication module, and wherein the control module sets up the communication link further based on the information about the connection request.

11. The apparatus of claim 7, wherein the control module further provides the vehicle information system with a broadband connection to the Internet.

12. A method for a vehicle information system for establishing a communication link between a mobile device and the vehicle information system, the method comprising:
    obtaining information about communication parameters for a communication link between the vehicle information system and the mobile device from the mobile device using a computer infrastructure; and
    establishing the communication link between the vehicle information system and the mobile device based on the information about the communication parameters, wherein the information about the communication parameters includes hot spot settings of the mobile device, wherein the mobile device is operable as a hot spot to establish the communications link
    wherein the computer infrastructure communicates the communication parameters to the vehicle information system via a vehicle-specific control channel.

13. A method for a mobile device for establishing a communication link between the mobile device and a vehicle information system, the method comprising:
    providing information about communication parameters for a communication link between the vehicle information system and the mobile device for the vehicle information system using a computer infrastructure; and
    establishing the communication link between the vehicle information system and the mobile device based on the information about the communication parameters.

14. A non-transitory computer program product having a program code for performing a method for establishing a communication link between a mobile device and a vehicle information system when the program code is executed on a computer, a processor, a control module or a programmable hardware component, the method comprising:
    obtaining information via a vehicle-specific control channel about communication parameters for a communication link between the vehicle information system and the mobile device from the mobile device using a computer infrastructure; wherein the information about communication parameters includes hot spot settings of the mobile device, and establishing the communication link between the vehicle information system and the mobile device based on the information about the communication parameters, wherein the mobile device is operable as a hot spot to establish the communications link.

15. A non-transitory computer program product having a program code for performing a method for establishing a communication link between a mobile device and a vehicle information system when the program code is executed on a computer, a processor, a control module or a programmable hardware component, the method comprising:

providing information about communication parameters for a communication link between the vehicle information system and the mobile device for the vehicle information system using a computer infrastructure; wherein the information about the communication parameters includes hot spot settings of the mobile device, and establishing the communication link between the vehicle information system and the mobile device based on the information about the communication parameters, wherein the mobile device is operable as a hot spot to establish the communications link.

* * * * *